United States Patent [19]

Lagergren et al.

[11] Patent Number: 4,967,592
[45] Date of Patent: Nov. 6, 1990

[54] TEST PROBE FOR USE IN A STORAGE TANK LEAK DETECTION SYSTEM

[75] Inventors: Peter J. Lagergren, Dallas; C. Cameron Allen, Jr., Richardson, both of Tex.

[73] Assignee: Pandel Instruments, Inc., Grand Prairie, Tex.

[21] Appl. No.: 480,809

[22] Filed: Feb. 16, 1990

[51] Int. Cl.⁵ .............................................. G01M 3/32
[52] U.S. Cl. ...................................... 73/49.2; 73/299
[58] Field of Search ................ 73/49.2, 298, 299, 302

[56] References Cited

U.S. PATENT DOCUMENTS

| | | | |
|---|---|---|---|
| 1,567,758 | 12/1925 | Schriever | 73/299 |
| 4,739,648 | 4/1988 | Horner | 73/49.2 |
| 4,885,931 | 12/1989 | Horner | 73/49.2 |
| 4,914,943 | 4/1990 | Lagergren | 73/49.2 |

FOREIGN PATENT DOCUMENTS

| | | | |
|---|---|---|---|
| 1475782 | 12/1969 | Fed. Rep. of Germany | 73/49.2 |
| 2520506 | 7/1983 | France | 73/49.2 |

*Primary Examiner*—Hezron E. Williams
*Assistant Examiner*—Joseph W. Roskos
*Attorney, Agent, or Firm*—David H. Judson

[57] ABSTRACT

A test probe is described for substantially eliminating measuring inaccuracies in a storage tank leak detection system caused by temperature-induced volumetric changes in the stored fluid product. The apparatus comprises an elongated tube, formed of a low temperature coefficient material, supported in the storage tank and having first and second ends and a substantially hollow core. A housing is attached to the second end of the elongated tube and is vented to the fluid product such that a portion of the fluid product enters the housing. An inner tube is located within the elongated tube and has an opening connected to the housing. The inner tube is preferably supported within an outer tube and the inner and outer tubes are separated by an evacuated space to provide thermal isolation of the inner tube from the elongated tube. A low temperature coefficient medium is then supported in the inner tube. According to the invention, a non-reactive liquid seal is supported in the housing between the medium and the fluid product for supporting the medium in the inner tube in static equilibrium with respect to the fluid product. The large disparity between the temperature coefficients of the medium and the fluid product insures that temperature-induced volumetric changes in the fluid product do not vary the level of the medium in the tube.

9 Claims, 4 Drawing Sheets

TEST PROBE FOR USE IN A STORAGE TANK LEAK DETECTION SYSTEM

TECHNICAL FIELD

The present invention relates generally to leak detection techniques for liquid storage tanks and particularly to a novel test probe for substantially eliminating measuring inaccuracies in an underground storage tank leak detection system caused by temperature-induced volumetric changes in the liquid stored in the tank.

BACKGROUND OF THE INVENTION

Underground storage tanks are used to store hazardous substances and petroleum products. It is estimated that a significant proportion of the nearly five million tanks in the United States are leaking harmful products into the environment. To ameliorate this problem, the Environmental Protection Agency (the "EPA") has recently promulgated regulations which require that any leakage exceeding a rate of 0.05 gallons per hour be detected and contained.

Methods for detecting leaks in underground storage tanks are well known in the prior art. Most of these techniques use a quantitative approach to identify a leak or to determine leak rate based on a measurement of volumetric changes of the stored product in the tank. The capability of prior art leak detection methods to accurately measure leakage is affected by certain variables such as temperature change, tank deformation, product evaporation, tank geometry and the characteristics of the stored product. The most significant of these factors is temperature variation, which causes dynamic expansion or contraction of the stored product on both a short-term and long term basis. Indeed, changes in ambient temperature throughout the day are often large enough so as to "mask" the leakage rate to be measured. For example, a change of 0.01° F. per hour in a 10,000 gallon tank will cause a 0.068 gallon change in the product volume per hour, thus offsetting or amplifying an observed leak rate.

Most of the prior art methods for leak detection attempt to compensate for such temperature variations. In quantitative techniques, i.e., tests based on product volume changes, temperature in the tank is typically sensed by a plurality of temperature sensors located at various levels or stratifications therein. The sensed temperature data is collected and processed to measure the volumetric average of product temperature during a test. Other techniques attempt to compensate for temperature variations by performing the leak test over very short or long time intervals. All such techniques are unsuccessful because of the difference between the measured temperature change and the actual temperature change during the applicable test interval.

One solution to the problem of temperature-induced volumetric changes in underground storage tank leak detection is described in U.S. Pat. No. 4,732,035 to Lagergren et al. This patent describes an apparatus comprising an elongated pressure tube having first and second ends an inlet adjacent the first end, and a substantially hollow core for supporting a liquid having a volumetric coefficient of expansion per degree Fahrenheit or Centigrade (a so called "temperature coefficient") substantially lower than the temperature coefficient of the stored product A bladder, formed of a material which expands or contracts with substantially no resistance to flow of the low temperature coefficient liquid, is connected to the pressure tube adjacent the second end thereof. The bladder supports a first portion of the low temperature coefficient liquid in static equilibrium with respect to a second portion of the liquid supported in the tube. The large disparity between the temperature coefficients of the liquid and the stored product insures that temperature-induced volumetric changes in the stored product do not cause material variations in the level of the liquid in the pressure tube. Accordingly, any fluctuation in the liquid level in the tube represents a true indication of leakage of the fluid product out of the storage tank or leakage of a foreign product (e.g., ground water) into the storage tank.

The apparatus described in U.S. Pat. No. 4,732,035 substantially eliminates measuring inaccuracies in a storage tank leak detection system. Given the benefits of this technology, it would be desirable to provide additional improvements thereto to further limit the potential for any measuring inaccuracies and to provide reliable and easy to use testing equipment.

BRIEF SUMMARY OF THE INVENTION

A test probe is described for substantially eliminating measuring inaccuracies in a storage tank leak detection system caused by temperature-induced volumetric changes in the stored fluid product. The apparatus comprises an elongated tube, formed of a low temperature coefficient material, supported in the storage tank and having first and second ends and a substantially hollow core. A housing is attached to the second end of the elongated tube and is vented to the fluid product such that a portion of the fluid product enters the housing. An inner tube is located within the elongated tube and has an opening connected to the housing. The inner tube is preferably supported within an outer tube and the inner and outer tubes are separated by an evacuated space to provide thermal isolation of the inner tube form the elongated tube. A low temperature coefficient medium is then supported in the inner tube.

According to the invention, a non-reactive liquid seal is supported in the housing between the medium and the fluid product for supporting the medium in the inner tube in static equilibrium with respect to the fluid product. The large disparity between the temperature coefficients of the medium and the fluid product insures that temperature-induced volumetric changes in the fluid product do not vary the level of the medium in the tube.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
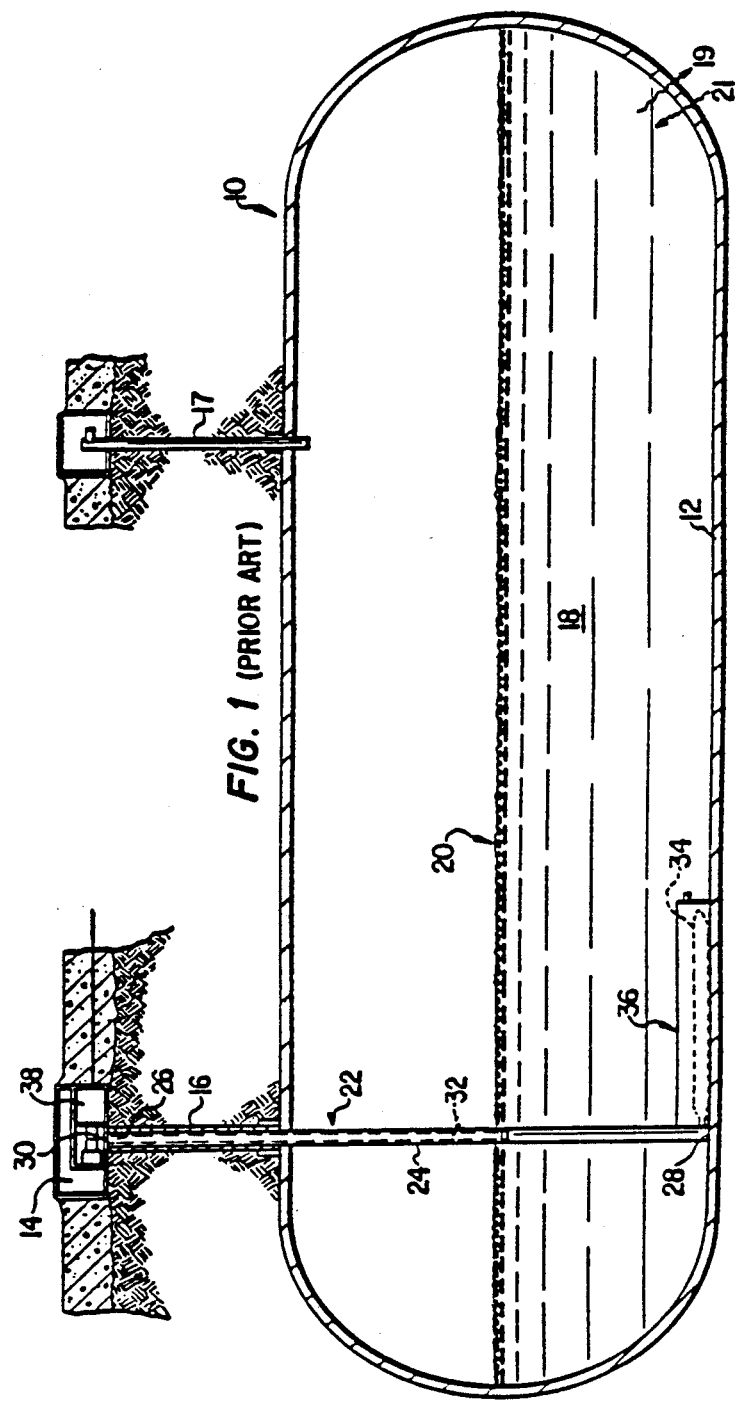
FIG. 1 is a sectional view of an prior art underground storage tank havinq a fluid product stored therein.

With reference now to the drawings wherein like reference characters designate like or similar parts through the several views, FIG. 1 is a perspective view of an underground storage tank 10 in which an apparatus for leak detection is used. As used herein, the term "underground" refers to any storage tank with at least some portion of its volume buried below ground. Such tanks are commonly used, for example, to store hazardous substances and hydrocarbon products such as gasoline and crude oil.

The underground storage tank 10 has a base 12 and is mounted with its longitudinal axis horizontal. The tank is generally located several feet below a manhole access port 14. A vertical riser pipe 16 is provided to connect an upper end of the tank 10 to the manhole access port 14, and a standpipe 17 is used to fill the tank. In particular, the tank 10 supports a fluid product 18, e.g., hydrocarbon fuel, which has a predetermined volumetric coefficient of expansion per degree Fahrenheit or Centigrade (a "temperature coefficient"). The tank includes a head space 15 above the level of the fluid product 18.

The level or height 20 (and therefore the volume) of the product 18 is affected by product leakage from the tank, designated by arrow 19, or leakage of foreign products into the tank, designated by arrow 21.

Referring back to FIG. 1, the problem of temperature-induced "masking" associated with storage tank leak detection methods is overcome through use of a temperature compensation apparatus 22. As described in U.S. Pat. No. 4,732,035, the apparatus 22 comprises an elongated pressure tube or manometer 24 which is supported in a substantially vertical manner in the tank 10 by the vertical riser pipe 16 or some other temporary or permanent means located in the tank. The pressure tube 24 is formed of a low temperature coefficient material, e.g., steel, brass or plastic, and has a first end 26, a second end 28, an inlet 30 adjacent the first end 26, and a substantially hollow core 32. The vertical riser pipe 16 or other support structure (e.g., a bracket within the tank) supports the pressure tube 24 in a manner such that the second end 28 of the tube 24 is located adjacent the base 12 of the tank 10. As also seen in FIG. 1, a limp bladder 34 is connected to the pressure tube 24 adjacent the second en 28 thereof for the purposes described below. A housing 36 may be provided overlaying the bladder 34 to prevent damage thereto during installation and/or operation of the apparatus 22.

According to U.S. Pat. No. 4,732,035, the elongated pressure tube 24 and the limp bladder 34 support a medium, e.g., a liquid, a liquid mixture or free flowing particles, having a temperature coefficient substantially lower than the temperature coefficient of the stored fluid product 18. The large disparity between the temperature coefficients of the medium supported in the pressure tube/bladder and the product 18 stored in the tank insures that temperature-induced volumetric changes in the product 18 do not "mask" leakage of the stored product out of the storage tank 10 or leakage of a foreign product into the tank. The apparatus 22 also includes a measuring device, designated generally by the reference numerical 38, for detecting true leakage into and from the storage tank 10.

The bladder 34 is formed of a material which expands or contracts with substantially little or no resistance to flow of the low temperature coefficient medium. The material, e.g., polyethylene or other plastic, therefore contributes an insignificant amount of hydrostatic pressure to the medium in the tube 24. For the purposes of the following discussion, the preferred "medium" is a low temperature coefficient liquid such as methylalkyl silicone ("MAS") or a fluorocarbon product.

Figure 2:
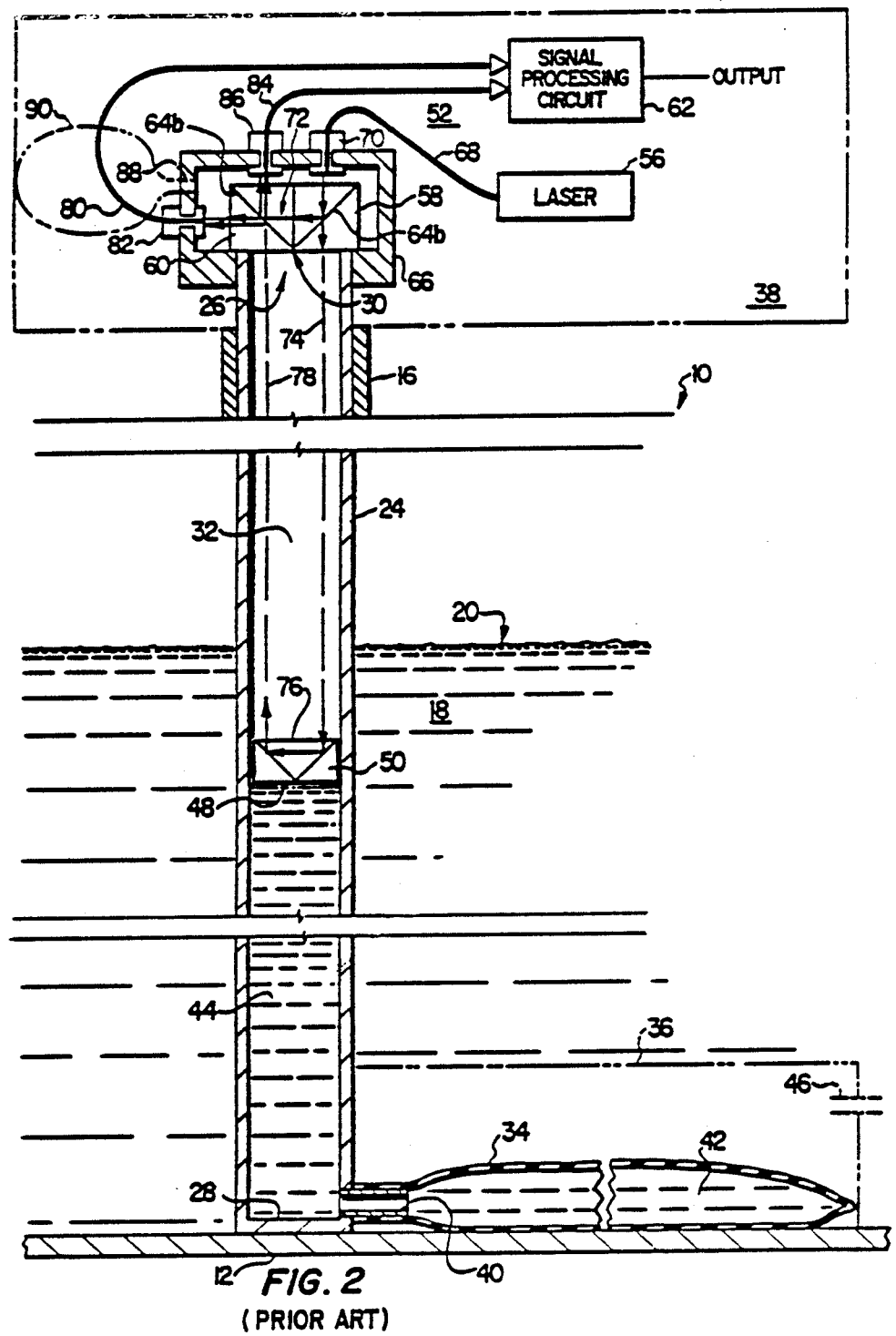
FIG. 2 is a detailed sectional view of a prior art apparatus for substantially eliminating measuring inaccuracies during leak detection caused by temperature-induced volumetric changes in the fluid product stored in the storage tank of FIG. 1.

Referring now to FIG. 2, a detailed sectional view of the apparatus 22 of FIG. 1 is shown. As seen in FIG. 2, the bladder 34 is securely fastened around a connecting conduit 40 integral to the second end 28 of the pressure tube 24. Accordingly, the interior volume of the bladder 34 supports a first portion 42 of the low temperature coefficient liquid in static equilibrium with respect to a second portion 44 of the liquid supported in the pressure tube 24.

As also seen in FIG. 2, the bladder 34 is supported by the base 12 of the storage tank 10 external to the pressure tube 10. As described above with respect to FIG. 1, the housing 36 preferably overlays the bladder 34 to protect the bladder 34 from damage during installation and/or operation of the apparatus. A vent 46 is provided in the housing to insure that the low temperature coefficient liquid portions supported in the pressure tube 24 and the bladder 34 remain in static equilibrium.

In operation, the pressure tube 24 and the limp bladder 34 are filled with the low temperature coefficient liquid and the tube is supported in a substantially vertical manner in the tank 10. The level 48 of the low temperature coefficient liquid in the pressure tube 24 is theoretically affected by the level (and volume) of the product 18 in the tank. However, while temperature-induced volume changes in the product cause the surface level 20 of the product to change, the level 48 of the liquid in the tube 24 remains substantially constant. This is because of the large disparity between the temperature coefficients of the liquid and the product 18. Accordingly, any variation in the level 48 of the second portion 44 of the liquid in the tube 24 represents a true indication of the leakage of the fluid product 18 out of the storage tank or leakage of a foreign product into the storage tank independent of temperature-induced product volume changes.

Variations in the level 48 of the liquid in the pressure tube 24 are sensed by the measuring device 38 which, in one embodiment, includes a float 50 supported by the second portion 44 of the low temperature coefficient liquid. The float is preferably formed of aluminum, plastic, glass or ceramic. The measuring device 38 preferably includes an interferometer 52 which measures interference patterns produced from signal waveforms bounced off of the float 50 to determine vertical displacement of the float and thus variations in the level of the low temperature coefficient liquid. As described above, such displacement represents true detection of a leak into or out of the storage tank 10. As seen in FIG. 2, the interferometer 52 is supported adjacent the first end 26 of the pressure tube 24 for generating the signal waveforms for use in detecting movement of the float 50 within the pressure tube 24.

The interferometer 52 generally includes a laser 56, a pair of first and second cube beamsplitters 58 and 60, and a signal processing circuit 62. The first and second cube beamsplitters 58 and 60 each contain a conventional half-silvered mirror, designated respectively by the reference numerals 64a and 64b, and are supported adjacent the inlet 30 of the pressure tube 24 by a housing 66. In operation, a signal from the laser 56 is input to the first cube beamsplitter 58 via a fiber optic conductor 68 supported in a bulkhead 70 of the housing 66. The mirror 64a in the first cube beamsplitter 58 receives this signal and in response thereto generates a reference signal 72 and a transmitted signal 74.

To detect variations in the level 48 of the low temperature coefficient liquid in the pressure tube 24, the transmitted signal 74 is reflected from a corner cube reflector 76 supported in the float 50 to form a reflected signal 78. The cube beamsplitter 60 receives the reflected signal 78 from the reflector 76 and combines this signal with the reference signal 72 to produce first and second output signals. Specifically, the reflected signal 78 is reflected 90° by the mirror 64b and added to the reference signal 72 to produce the first output signal, i.e., an interference fringe pattern, which is coupled from the housing 66 via a fiber optic conductor 80 supported in a bulkhead 82. The mirror 64b also produces the second output signal which, because it passes directly through mirror 64b, is offset in phase from the first output signal. The second output signal is coupled from the housing 66 via the fiber optic conductor 84 supported in a bulkhead 86. As will be described in more detail below, the first and second output signals are supplied via the fiber optic conductors 80 and 84 to the signal processing circuit 62.

Generally, circuit 62 determines the direction of motion of the interference fringes represented by the output siqnals, thereby indicating whether the corner cube reflector 76 supported in the float 50 is moving up or down and at what rate. If the level 48 of the liquid in the pressure tube 24 increases, then leakage of a foreign product (e.g., ground water) into the tank is indicated. To the contrary, if the level 48 of the liquid decreases, then a leak from the tank 10 is indicated. As described above, however, the large disparity between the temperature coefficients of the low temperature coefficient liquid and the high temperature coefficient stored product 18 insures that temperature-induced volumetric changes in the product have little or no material effect on the level 48 of the liquid.

As also seen in FIG. 2, the housing 66 for supporting the first and second cube beamsplitters 58 and 60 includes a vent 88 for insuring that the first and second portions 42 and 44 of the low temperature coefficient liquid remain in static equilibrium in the bladder and the pressure tube. A second limp bladder 90 is connected to the vent 88 and thus to the inlet 30 of the pressure tube 24 for sealing and protecting the low temperature coefficient liquid from contamination by the high temperature coefficient fluid product. Preferably, the bladder 90 is filled with an inert gas such as nitrogen or argon.

Figure 3:
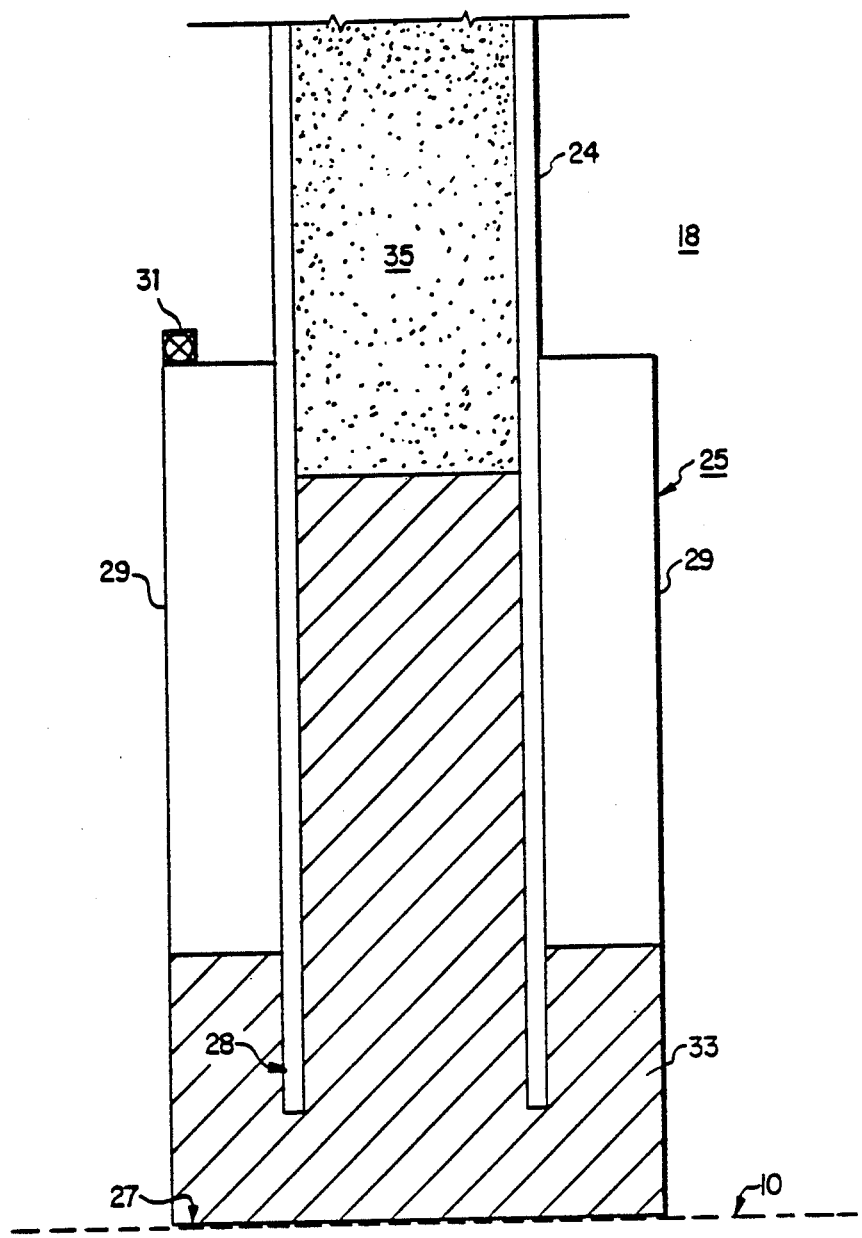
FIG. 3 is a detailed sectional view of an alternate apparatus for substantially eliminating measuring inaccuracies during leak detection.

An alternate embodiment of the apparatus 22 is shown in FIG. 3 and described in copending application Ser. No. 07/312,864. In this embodiment, the limp bladder supported adjacent the second end 28 of the elongated pressure tube 24 is replaced by a housing 25 that is partially or substantially vented to the hydrocarbon product 18 supported in the tank 10. The housing 25 includes a base 27 and a circular sidewall 29, and is vented to the hydrocarbon product 18 through opening 31 (or a valve) in the top portion of the housing 25. The housing could alternatively have a rectangular or other shape with a closed top (except to the pressure tube) as long as it remains vented to the hydrocarbon product 18 in some manner (e.g., through one or more openings in the sidewall). As best seen in FIG. 3, the second end 28 of the pressure tube 24 is supported adjacent the base 27 of the housing 25 such that, without a barrier, the hydrocarbon product 18 could theoretically be forced up into the pressure tube 24.

As also shown in FIG. 3, the pressure tube 24 supports a low temperature coefficient medium. As described above, the height of the column of the low temperature coefficient medium is monitored and measured to determine true volumetric changes of the hydrocarbon product in the tank. According to this embodiment, the low temperature coefficient medium is supported in the pressure tube 24 in static equilibrium with respect to the hydrocarbon product 18 in the tank 10 by virtue of a non reactive, liquid barrier seal 33 supported in the housing 25 between the hydrocarbon product 18 and the low temperature coefficient medium supported in the pressure tube 24. The liquid barrier seal comprises a working fluid that is immiscible to both the product 18 and the low temperature coefficient medium. The seal therefore prevents the hydrocarbon product 18 from mixing with the low temperature coefficient medium and vice versa. In the preferred embodiment, the working fluid is a flourinated silicone such as the methylalkyl silicone (MAS) used in the earlier embodiments as the low temperature coefficient medium itself. The low temperature coefficient medium 35 in the pressure tube is then preferably deionized or distilled water. As in the bladder embodiment shown in FIGS. 1 and 2, the large disparity between the temperature coefficients of the distilled water and the hydrocarbon product insures that temperature-induced volumetric changes in the hydrocarbon product do not cause material variations in the level of the distilled water in the pressure tube. Yet, true variations in the volume of hydrocarbon product due to leaks can be accurately measured because such changes are transmitted to the distilled water column via the immiscible working fluid seal.

Therefore, in the embodiment shown in FIG. 3, the liquid barrier seal serves to prevent mixing of the fluid supported in the tank and the low temperature coefficient liquid supported in the pressure tube. The seal also advantageously acts to maintain these liquids in static equilibrium to thereby enable true volumetric changes to be accurately reflected and measured. In an alternate embodiment of the apparatus shown in FIG. 5, the liquid barrier seal 3 can also be used as the low temperature coefficient medium itself. In this alternate embodiment, the distilled water is not required but the amount of immiscible fluid used is therefore correspondingly increased. The level of the immiscible fluid column in the pressure tube is then monitored as described above to sense true volumetric changes of the hydrocarbon fluid caused by leaks.

Figure 4:
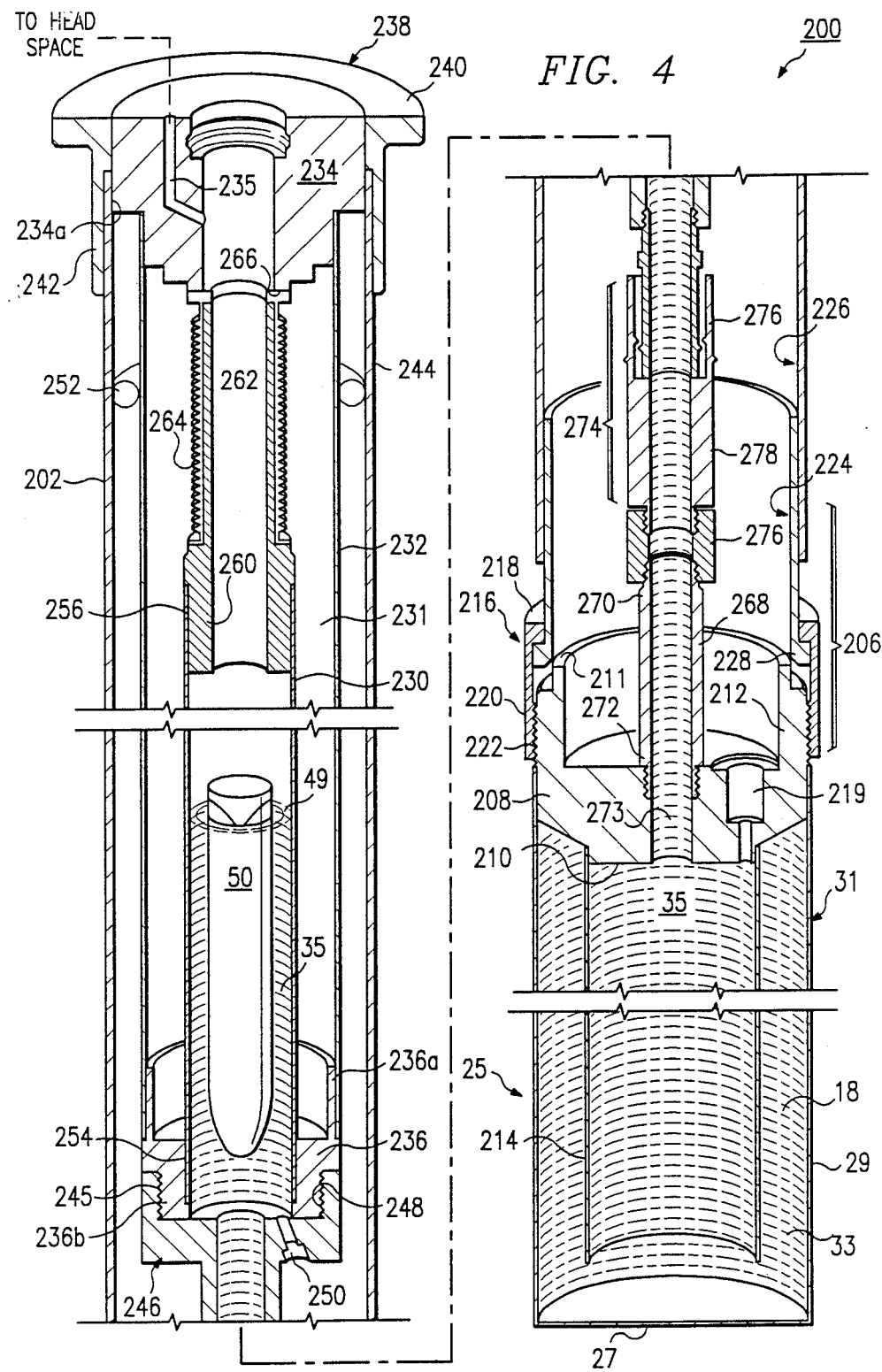
FIG. 4 is a detailed view of a preferred embodiment of a test probe according to the present invention which includes an apparatus substantially as shown in FIG. 3.

Referring now to FIG. 4, a detailed view is shown of a preferred embodiment of a test probe 200 according to the present invention that incorporates the principles of the apparatus described above with respect to FIG. 3. The test probe 200 includes a tube 202, preferably formed of a low temperature coefficient material such as graphite or the like, which is removably secured to the housing 25 by a coupling assembly 206. As described earlier, housing 25 includes a base 27 and a circular sidewall 29, and is vented to the hydrocarbon product 18 through openinq 31 (or a valve) in the top portion of the housing 25.

Coupling assembly 206 includes a cap 208 having a first end 210, a second end 211 and a threaded sleeve portion 212. The first end 210 of the cap 208 supports a tube 214, with the tube 214 corresponding to the second end 28 of the pressure tube 24 as described with respect to FIG. 3. Coupling assembly 206 also includes a coupling nut 216 having an annular ring portion 218 and a sleeve 220. Sleeve 220 includes a threaded portion 222 which is adapted to be threaded to the threaded portion 212 of the cap 208. The coupling assembly 206 also includes a flange 224 having a sleeve bonded or otherwise secured to an interior wall 226 of the outer tube 202. The flange 224 includes an annular ring portion 228 adapted to mate with the annular ring portion 218 of the coupling nut 216. Cap 208 also includes an aperture 219 for supporting a temperature sensor (not shown).

The housing 25 supports a non reactive, liquid barrier seal between the hydrocarbon product 18 and a low temperature coefficient medium supported in the remainder of the test probe 200. As previously described, the liquid barrier seal 33 comprises a working fluid that is immiscible to both the product 18 and the low temperature coefficient medium. The seal therefore prevents the hydrocarbon product 18 from mixing with the low temperature coefficient medium and vice versa. In the preferred embodiment, the working fluid 33 is a flourinated silicone and the low temperature coefficient medium 35 is then preferably deionized or distilled water.

Referring simultaneously to FIGS. 1–4, the distilled water or other low temperature coefficient medium 35 supports a float 50 which is used by the interferometer 52 to sense variations in the level of the medium. The float 50 is located within an inner tube and includes a ring 49 secured adjacent the top thereof. Float 50 is a self-centering device which uses the meniscus developed in the annular space between the ring 49 and the inner peripheral surface of the inner tube 230. In particular, the ring 49 is positioned on the float body such that a u shaped meniscus forms between the ring exterior edge and the wall. The interaction of the ring and the wall meniscus provides self-centering in that for the ring to contact the wall it must first climb up the wall meniscus. The increase in potential energy necessary to climb the meniscus is greater than the attractive forces between the ring and the wall, thus the float is maintained centered in the low temperature coefficient medium.

As noted above, the float 50 is located within an inner tube 230 which is in turn located within an outer tube 232. The tubes are thus separated by a space 231. Tubes 230 and 232 are preferably formed of stainless steel, aluminum or copper, and are supported within the graphite tube 202 by a pair of tube flanges 234 and 236. In particular, the graphite tube 202 has an openinq in its upper end portion adapted to receive the upper tube flange 234. The upper tube flange 234, which includes a vent channel 235, is secured within the openinq of the graphite tube 202 by a laser support flange 238 having an annular ring portion 240 and a sleeve 242 bonded or otherwise secured to the outer wall 244 of the graphite tube 202. The vent channel 235 is connected to the head space 15 of the tank. The lower tube flange 236 has a threaded sleeve portion 245 that is threadably secured to a t-shaped coupling 246 havinq threads 248. Coupling 246 also includes an openinq 250 for supporting a temperature sensor (not shown).

Upper and lower tube flanges 234 and 236 include appropriate radial support surfaces 234a and 236a for supporting the outer tube 232. One or more spacer sleeves 252 can be provided between the outer tube 232 and the inner wall of the graphite tube to stabilize the outer tube. The lower tube flange 236 includes an inner sleeve 236b for receiving a bottom end 254 of the inner tube 230. An upper end 256 of the inner tube 230 is in turn bonded or otherwise secured to a first end 258 of a stabilizer tube 260. Tube 260 has a sleeve 262 about which a bellows 264 is provided. Bellows 264, which allows longitudinal expansion and contraction of the inner tube 230 as will be described, is secured to a facing portion 266 of the upper tube flange 234.

The remainder of the test probe 200 comprises a conduit 268 havinq upper and lower ends 270 and 272. The lower end 272 is threadably-secured to an aperture 273 centrally located in the cap 208. The upper end 270 is in turn attached to a quick disconnect assembly 274 by a coupling nut 276. The quick disconnect assembly is conventional and includes upper and lower sections 276 and 278. Therefore, the housing 25 and tube 214 are separable from the remainder of the probe 200 by unscrewing the coupling nut 216 and separating the first and second sections 276 and 278 of the quick disconnect assembly 274.

A column of the low temperature coefficient medium 35 is therefore supported (above the barrier 33) in the tube 214, the conduit 268, the coupling nut 276, the quick disconnect assembly 274, the coupling 246, the lower tube flange 236 and the inner tube 230.

According to the present invention, the tube 200 is formed of graphite or some other similar low temperature coefficient of expansion material. The graphite tube insures that longitudinal temperature variations in the fluid product along the length of the tube 202 are not transmitted to the medium 35 that is supported in the inner tube 230. Additional isolation of the medium 35 from such temperature variations is further provided according to the invention by thermally isolating the tube 202 from the inner tube 230 in which the low temperature coefficient material is supported. In the preferred embodiment, this thermal isolation is provided by outer tube 232 and by evacuating the space 231 located between the inner and outer tubes 230 and 232. This vacuum is preferably created during manufacture of the test probe. Alternatively, a low temperature coefficient fluid can be introduced into the space 231 by a pump 233 vented through the upper tube flange. The pump circulates the fluid to maintain such additional thermal isolation. As also described above, the bellows 264 is further provided surrounding an upper portion of the inner tube for allowing longitudinal expansion and contraction of the inner tube 230. Thus even if the thermal isolation provided by the outer tube and the evacuated space 231 (or circulating fluid) does not completely eliminate all temperature variations along the inner tube length, the bellows 264 provides additional compensation if needed.

The structure of the test probe 200 described above provides significant advantages and efficiencies. The probe provides substantially complete thermal isolation between the fluid product and the low temperature coefficient medium underlying the float 50. The graphite tube 202 extends this thermal isolation longitudinally and ensures a stable temperature reference along the entire length of the probe. Because the medium 35 is both longitudinally and radially isolated from temperature-induced volumetric changes, extremely accurate readings of the medium level are obtained by the interferometer.

If desired, the tube 202 and the housing 25 may be integrally-formed. In such case the lower end of the tube 202 would include an appropriate vent for enabling the fluid product to enter the bottom of the tube. Moreover, it should be appreciated that the test probe can be used with any precision ranging apparatus including a doppler effect interferometer.

Although the invention has been described in detail, the same is by way of illustration and example only and is not to be taken by way of limitation, the spirit and scope of the invention being limited only to the terms of the appended claims.

We claim:

1. A test probe for substantially eliminating measuring inaccuracies in a storage tank leak detection system caused by temperature-induced volumetric changes in the fluid product stored in the storage tank, comprising:
   an elongated tube supported in the storage tank and having first and second ends and a substantially hollow core, the elongated tube formed of a material having a temperature coefficient substantially lower than the temperature coefficient of the fluid product;
   a housing attached to the second end of the elongated tube and being vented to the fluid product such that a portion of the fluid product enters the housing;
   an inner tube located within the elongated tube and having an opening connected to the housing;
   means for thermally isolating the inner tube from the elongated tube;
   a medium supported in the inner tube and having a temperature coefficient substantially lower than the temperature coefficient of the fluid product; and
   a non-reactive liquid seal supported in the housing between the medium and the fluid product for supporting the medium in the inner tube in static equilibrium with respect to the fluid product, wherein the large disparity between the temperature coefficients of the medium and the fluid product insures that temperature-induced volumetric changes in the fluid product do not vary the level of the medium in the tube.

2. The test probe as described in claim 1 wherein the means for thermally isolating the inner tube from the elongated tube comprises:
   an outer tube located between the elongated tube and the inner tube, wherein the inner tube and the outer tube are separated by a predetermined space; and
   wherein the space is evacuated.

3. The test probe as described in claim 2 wherein the outer tube includes means for supporting the inner tube.

4. The test probe as described in claim 1 wherein the means for thermally isolating the inner tube from the elongated tube comprises:
   an outer tube located between the elongated tube and the inner tube, wherein the inner tube and the outer tube are separated by a predetermined space; and
   means for circulating a fluid having a low temperature coefficient within the predetermined space.

5. The test probe a described in claim 4 wherein the outer tube includes means for supporting the inner tube.

6. The test probe as described in claim 1 wherein the elongated tube is formed of graphite.

7. The test probe as described in claim 1 further including a bellows surrounding the inner tube for allowing longitudinal expansion and contraction of the inner tube.

8. The test probe as described in claim 1 further including detaching means connected between elongated tube and the housing for enabling the housing to be quickly detached from the elongated tube.

9. The test probe as described in claim 1 wherein the low temperature coefficient medium is distilled water.

* * * * *